United States Patent
Uchida

(10) Patent No.: US 7,194,115 B2
(45) Date of Patent: Mar. 20, 2007

(54) FINGERPRINT IDENTIFICATION METHOD AND APPARATUS

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 819 days.

(21) Appl. No.: 10/333,755

(22) PCT Filed: Jul. 26, 2001

(86) PCT No.: PCT/JP01/06445

§ 371 (c)(1),
(2), (4) Date: Jan. 24, 2003

(87) PCT Pub. No.: WO02/11066

PCT Pub. Date: Feb. 7, 2002

(65) Prior Publication Data

US 2003/0123715 A1 Jul. 3, 2003

(30) Foreign Application Priority Data

Jul. 28, 2000 (JP) ............................... 2000-23042

(51) Int. Cl.
*G06K 9/00* (2006.01)
*G05B 19/00* (2006.01)

(52) U.S. Cl. .................. 382/124; 340/5.53; 902/2; 713/186

(58) Field of Classification Search ........ 382/124–127, 382/115–123; 340/5.1, 5.2, 5.52, 5.53; 902/3; 713/186
See application file for complete search history.

(56) References Cited

U.S. PATENT DOCUMENTS

| 4,581,760 | A | * | 4/1986 | Schiller et al. ............. 382/124 |
| 4,933,976 | A | * | 6/1990 | Fishbine et al. ............ 382/127 |
| 5,040,223 | A | | 8/1991 | Kamiya et al. |
| 5,982,913 | A | * | 11/1999 | Brumbley et al. .......... 382/124 |
| 6,031,942 | A | * | 2/2000 | Nakayama ................ 382/284 |
| 6,289,114 | B1 | * | 9/2001 | Mainguet ................... 382/124 |
| 6,459,804 | B2 | * | 10/2002 | Mainguet ................... 382/124 |
| 6,483,932 | B1 | * | 11/2002 | Martinez et al. ............ 382/124 |
| 6,580,816 | B2 | * | 6/2003 | Kramer et al. .............. 382/124 |

(Continued)

FOREIGN PATENT DOCUMENTS

| JP | 01-209585 A | 8/1989 |
| JP | 10-143663 A | 5/1998 |

OTHER PUBLICATIONS

Naohisa Kosake et al., English Translation of "Fingerprint Information Processor", JP 10-143663, May 29, 1998, Hamamatsu Photonics KK.*

*Primary Examiner*—Jingge Wu
*Assistant Examiner*—Aaron Carter
(74) *Attorney, Agent, or Firm*—Sughrue Mion, PLLC

(57) ABSTRACT

A method and device for fingerprint identification implementing precise identification at a high speed by using partial images of a fingerprint obtained through relative movements of a finger to a small sized sensor are provided. The device includes a frame input unit for inputting a partial image of a fingerprint. A registered image optimum position calculating unit compares the partial image to a registered fingerprint and an image combining unit creates a composite of the partial images using the optimum position. A fingerprint collating unit judges the similarity between the composite image and registered fingerprint to determine the correlation between the partial images and the registered fingerprint.

12 Claims, 8 Drawing Sheets

U.S. PATENT DOCUMENTS

| | | | |
|---|---|---|---|
| 6,917,694 B1* | 7/2005 | Machida et al. | 382/124 |
| 6,944,321 B2* | 9/2005 | Hamid | 382/124 |
| 7,043,061 B2* | 5/2006 | Hamid et al. | 382/124 |
| 2001/0026636 A1* | 10/2001 | Mainguet | 382/124 |
| 2001/0043728 A1* | 11/2001 | Kramer et al. | 382/124 |
| 2002/0012455 A1* | 1/2002 | Benckert | 382/124 |
| 2003/0002718 A1* | 1/2003 | Hamid | 382/124 |
| 2003/0002719 A1* | 1/2003 | Hamid et al. | 382/124 |
| 2003/0007670 A1* | 1/2003 | Hamid | 382/124 |
| 2003/0086625 A1* | 5/2003 | Hamid | 382/275 |

\* cited by examiner

F I G. 1
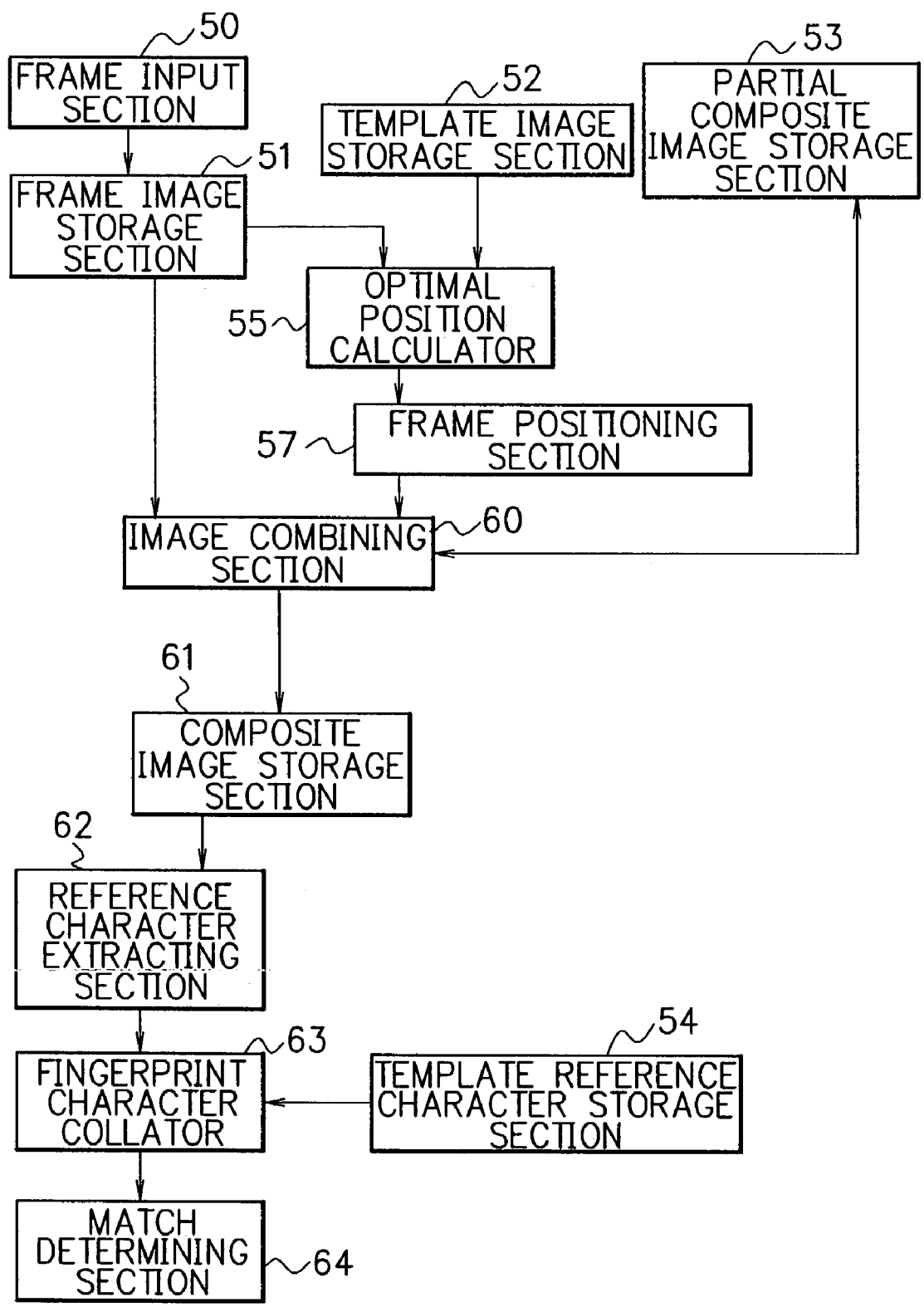

(a)

(b)

(c)

(d)

(e)

(f)

F I G. 7
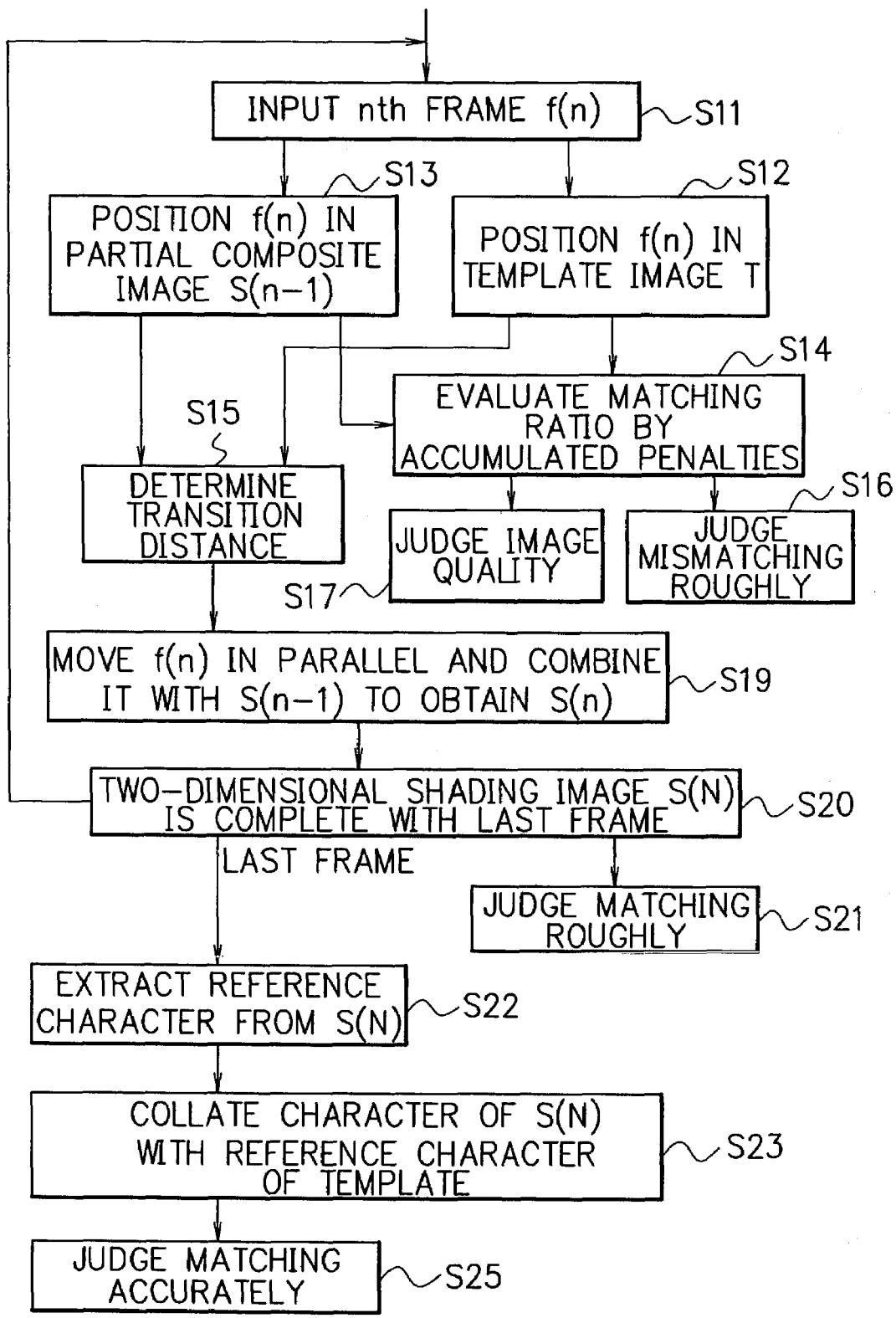

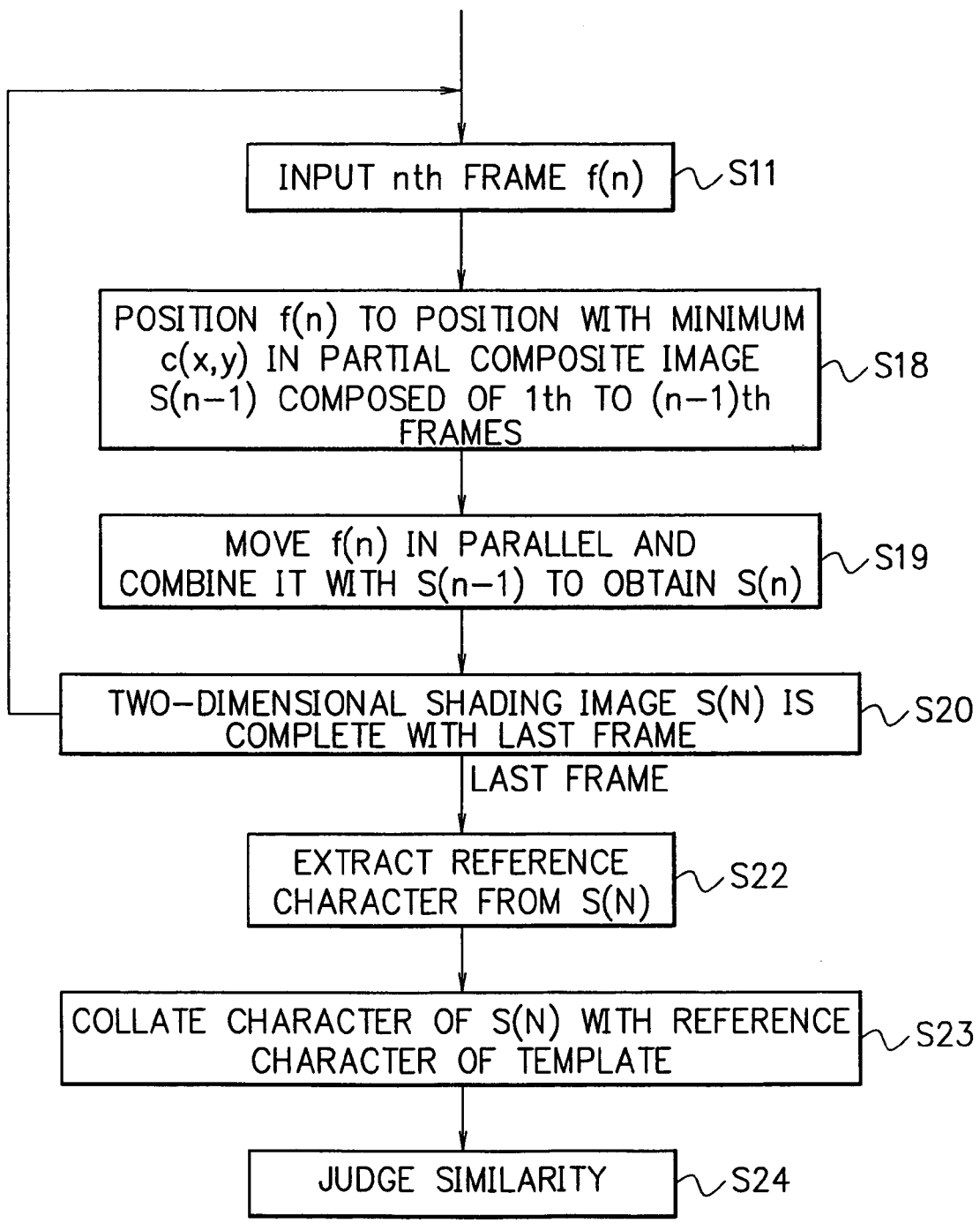

FINGERPRINT IDENTIFICATION METHOD AND APPARATUS

TECHNICAL FIELD

The present invention relates to a method and device for fingerprint identification especially on information appliances for individuals or a small number of users, in which inputted plural partial images of a fingerprint are combined to be used for the fingerprint identification

BACKGROUND ART

Fingerprint identification, which exploits characteristics of fingerprints such as individuality and lifelong invariance, is effective in identifying a user on an information appliance or in information service. In the process of user verification adopting the fingerprint identification, first, a user X inputs his/her fingerprint from a fingerprint input section when making use of an information appliance or information service; next, the inputted fingerprint is collated with previously inputted and stored fingerprint data (referred to as a template) of a registered user A who has the authority to use the information appliance or information service; and the user X is allowed to use the information appliance or information service if both the fingerprints match each other.

For inputting a fingerprint, a two-dimensional sensor input unit having a squarish input screen enough wider than a fingerprint region has been widely employed. However, in order to expand the field of application of the input unit through cost cutting and miniaturization, it is better to provide the input unit with a sensor screen smaller than a fingerprint region and perform the fingerprint verification by using a sequence of partial fingerprint images obtained by moving a finger relative to the small sensor screen (referred to as sweep motion).

There is disclosed a technique as an example of using the small sensor screen in Japanese Patent Application Laid-Open No. HEI10-91769, wherein a two-dimensional image used for verification is composed of a sequence of partial images obtained by sliding a finger on a rectangle, almost one-dimensional line shaped sensor, whose long sides are approximately as wide as a finger and the other sides are much shorter than the long sides, in the direction parallel to the short side. According to the technique, the line shaped sensor sequentially picks up shading images corresponding to ridge patterns of a fingerprint as a finger moves thereon, and thus a sequence of rectangle partial images, in other words, line shaped shading images are inputted one by one to an input unit with the course of time. The partial image obtained by one image pickup is referred to as a frame or a frame image.

FIG. 8 shows the general procedures of the conventional technique as described below to reassemble a series of partial images into a two-dimensional image and perform fingerprint verification when the frame images are sequentially inputted.

① A physical relationship between an inputted partial image and the adjacent one, namely, two-dimensional distance between the frame images is detected for positioning the images (step S11, S18).

② A two-dimensional image S(N) is composed of the partial images, which have been mutually put in position according to the positioning (step S19, S20).

③ Specific features of the obtained two-dimensional image S(N) are extracted for verification (step S22).

④ The extracted features are collated with specific features of a previously registered fingerprint (template) (step S23), and verification is completed when the features of the fingerprints match each other (step S24).

For the above-mentioned positioning (①), Sequential Similarity Detection Algorithm (SSDA) is applicable. Let's say, for example, the first to (n−1)th (n: an integer 2 or more) frame images have been inputted and, as a result of the positioning and composition of the images, a partial composite image S(n−1; i, j) (i and j denote x-coordinate and y-coordinate, respectively) has been figured out. When the nth frame image f(n; i, j) is inputted thereto, it is positioned to the partial composite image S(n−1; i, j) to combine the images. In the positioning according to the SSDA method, the nth frame image f(n; i, j) is moved in parallel little by little and overlapped onto the partial composite image S(n−1; i, j). Consequently, the best-matching position is determined as an optimal position of the frame image f(n; i, j). In order to implement the above operation, at the point where the frame image f(n; i, j) is translated by (x, y), cumulative error c(x, y) (referred to as penalty) in density levels of shading between two images is calculated by the following expression to find (x, y) with the minimum penalty c(x, y).

$$c(x, y) = \sum_i \sum_j |S(n-1; i, j) - f(n; i-x, j-y)| \quad (1)$$

Incidentally, two cumulative sums Σ are found over i and j regarding a certain area in the overlapping regions of the partial composite image S(n−1; i, j) and the frame image f(n; i, j).

In the above process ② for composing a two-dimensional image, the frame image f(n; i, j) is moved in parallel by (x, y) that achieve the minimum penalty c(x, y) and combined with the partial composite image S(n−1; i, j), and thus a new partial composite image S(n; i, j) is figured out.

However, according to the conventional technique, when the sweep (movement) rate of a finger against the sensor is high and the overlapping area between each frame is small, it is difficult to obtain the optimal distance of each inter-frame. That is, accurate positioning cannot be conducted when a user slides his/her finger swiftly, which causes a failure in reassembling a correct two-dimensional image, and thus the accuracy of fingerprint verification is deteriorated. To put it the other way around, a user is required to move his/her finger slowly in order to assure the stable collating operation, and thus causing degradation in usability.

As set forth hereinabove, in the conventional method and device for fingerprint verification, there is a problem that a user has to move his/her finger slowly on the sensor to improve the accuracy of fingerprint verification, and therefore usability of the device is deteriorated.

Problems that the Invention is to Solve

It is therefore an object of the present invention to provide a method and device for fingerprint identification enabling the precise positioning of inputted plural partial images by taking advantage of characteristics of information appliances for individuals that there are limited number of fingerprint data or templates of registered users, and thus realizing highly accurate fingerprint verification.

It is a further object of the present invention to reduce necessary calculations and speed up the process by achieving effective positioning, or to reduce the price of a computing unit used for the process as well as performing fingerprint verification with accuracy equal to, or higher than that of conventional verification with a sensor smaller than a conventional one, and thus realizing a low cost sensor and the wider range of applications.

It is a still further object of the present invention to provide a method and device for fingerprint identification; in which a moderately accurate verification result can be obtained at a higher speed, or with less computation when highly accurate verification is not required.

DISCLOSURE OF THE INVENTION

In accordance with the present invention as set forth in claim 1, to achieve the above objects, there is provided a fingerprint identification method, in which a sequence of partial images of a fingerprint is inputted and the similarity between the inputted fingerprint and a previously registered one is judged, comprising the steps of: deciding a position for each of the partial images by using image information of the registered fingerprint; accumulating first penalty indices, each of which is a minimum value at a position bearing the closest resemblance to each of the partial images in the registered fingerprint image; and determining that the inputted fingerprint differs from the registered one when the cumulative sum exceeds a predetermined penalty threshold.

A fingerprint identification method in accordance with the present invention as set forth in claim 2, in which a sequence of partial images of a fingerprint is inputted and the similarity between the inputted fingerprint and a previously registered one is judged, comprises the steps of: deciding a position for each of the partial images by using image information of the registered fingerprint; calculating a first penalty index of each partial image, which is a minimum value at a position bearing the closest resemblance to each of the partial images in the registered fingerprint image; arranging and combining the partial images based on the information about the position bearing the closest resemblance to each of the partial images to obtain a composite image; collating the composite image with the registered fingerprint image; accumulating the first penalty indices; and determining that the inputted fingerprint differs from the registered one when the cumulative sum exceeds a predetermined penalty threshold.

A fingerprint identification method in accordance with the present invention as set forth in claim 3, in which a sequence of partial images of a fingerprint is inputted and the similarity between the inputted fingerprint and a previously registered one is judged, comprises the steps of: deciding a position for each of the partial images by using image information of the registered fingerprint; accumulating first penalty indices, each of which is a minimum value at a position bearing the closest resemblance to each of the partial images in the registered fingerprint image; and determining that the inputted fingerprint resembles to the registered one when the cumulative sum of the first penalty indices does not exceed a predetermined penalty threshold, and the area of a partial composite image becomes larger than a predetermined area threshold.

A fingerprint identification method in accordance with the present invention as set forth in claim 4, in which a sequence of partial images of a fingerprint is inputted and the similarity between the inputted fingerprint and a previously registered one is judged, comprises the steps of: deciding a position for each of the partial images by using image information of the registered fingerprint; calculating a first penalty index of each partial image, which is a minimum value at a position bearing the closest resemblance to each of the partial images in the registered fingerprint image; arranging and combining the partial images based on the information about the position bearing the closest resemblance to each of the partial images to obtain a composite image; collating the composite image with the registered fingerprint image; accumulating the first penalty indices; and determining that the inputted fingerprint resembles to the registered one when the cumulative sum of the first penalty indices does not exceed a predetermined penalty threshold, and the area of the partial composite image becomes larger than a predetermined area threshold.

A fingerprint identification method in accordance with the present invention as set forth in claim 5, in which a sequence of partial images of a fingerprint is inputted and the similarity between the inputted fingerprint and a previously registered one is judged, comprises the steps of: deciding a position for each of the partial images by using image information of the registered fingerprint; calculating a first penalty index of each partial image, which is a minimum value at a position bearing the closest resemblance to each of the partial images in the registered fingerprint image; arranging and combining the partial images based on the information about the position bearing the closest resemblance to each of the partial images to obtain a composite image; collating the composite image with the registered fingerprint image; finding a position where the partial image fits with least discordance in the partial composite image while finding the position bearing the closest resemblance to each partial image in the registered fingerprint image; and arranging and combining the partial images based on the result.

A fingerprint identification method as set forth in claim 6, in the method claimed in claim 5, further comprises the steps of: calculating a second penalty index of each partial image, which is a minimum value at a position where the partial image fits with least discordance in the partial composite image as well as the first penalty index; and integrating calculation results of the first and second penalty indices according to the weighted average of the penalty indices to determine the position.

A fingerprint identification method as set forth in claim 7, in the method claimed in claim 5, further comprises the steps of: integrating calculation results of the first and second penalty indices according to a weighted average method, in which the second penalty index adds weight as the partial images are added to the partial composite image; and determining the position based on the integration result.

A fingerprint identification device in accordance with the present invention as set forth in claim 8, for judging the similarity between an inputted fingerprint and a previously registered one by using a sequence of partial images of the fingerprint, comprising: a frame image input means for inputting the partial images of the fingerprint; a registered image optimum position calculating means for calculating first penalty indices, each of which is a minimum value at a position bearing the closest resemblance to each of the partial images in the registered fingerprint image; an image combining means for combining the partial image arranged at the position bearing the closest resemblance with a partial composite image having been composed up to this point to produce an extended partial composite image; a fingerprint collating means for judging the similarity between a composite image composed of all the inputted partial images and the registered fingerprint image; and a composite image optimum position calculating means for finding a position where the partial image fits with least discordance in the partial composite image composed of previous partial images; wherein the image combining means combines the partial images according to the results derived by the registered image optimum position calculating means and the composite image optimum position calculating means.

A fingerprint identification device in accordance with the present invention as set forth in claim 9, for judging the similarity between an inputted fingerprint and a previously registered one by using a sequence of partial images of the fingerprint, comprising: a frame image input means for inputting the partial images of the fingerprint; a registered image optimum position calculating means for calculating first penalty indices, each of which is a minimum value at a position bearing the closest resemblance to each of the partial images in the registered fingerprint image; an image combining means for combining the partial image arranged at the position bearing the closest resemblance with a partial composite image having been composed up to this point to produce an extended partial composite image; a fingerprint collating means for judging the similarity between a composite image composed of all the inputted partial images and the registered fingerprint image; and a mismatch determination means for accumulating the first penalty indices and determining that the inputted fingerprint differs from the registered one when the cumulative sum exceeds a predetermined penalty threshold.

A fingerprint identification device in accordance with the present invention as set forth in claim 10, for judging the similarity between an inputted fingerprint and a previously registered one by using a sequence of partial images of the fingerprint, comprising: a frame image input means for inputting the partial images of the fingerprint; a registered image optimum position calculating means for calculating first penalty indices, each of which is a minimum value at a position bearing the closest resemblance to each of the partial images in the registered fingerprint image; an image combining means for combining the partial image arranged at the position bearing the closest resemblance with a partial composite image having been composed up to this point to produce an extended partial composite image; a fingerprint collating means for judging the similarity between a composite image composed of all the inputted partial images and the registered fingerprint image; a composite image optimum position calculating means for finding a position where the partial image fits with least discordance in the partial composite image composed of previous partial images; and a mismatch determination means for accumulating the first penalty indices and determining that the inputted fingerprint differs from the registered one when the cumulative sum exceeds a predetermined penalty threshold.

A fingerprint identification device in accordance with the present invention as set forth in claim 11, for judging the similarity between an inputted fingerprint and a previously registered one by using a sequence of partial images of the fingerprint, comprising: a frame image input means for inputting the partial images of the fingerprint; a registered image optimum position calculating means for calculating first penalty indices, each of which is a minimum value at a position bearing the closest resemblance to each of the partial images in the registered fingerprint image; an image combining means for combining the partial image arranged at the position bearing the closest resemblance with a partial composite image having been composed up to this point to produce an extended partial composite image; a fingerprint collating means for judging the similarity between a composite image composed of all the inputted partial images and the registered fingerprint image; and a rough match determination means for accumulating the first penalty indices, and determining that the inputted fingerprint matches the registered one when the cumulative sum of the first penalty indices does not exceed a predetermined penalty threshold, and the area of the partial composite image combined by the image combining means becomes larger than a predetermined area threshold.

A fingerprint identification device in accordance with the present invention as set forth in claim 12, for judging the similarity between an inputted fingerprint and a previously registered one by using a sequence of partial images of the fingerprint, comprising: a frame image input means for inputting the partial images of the fingerprint, a registered image optimum position calculating means for calculating first penalty indices, each of which is a minimum value at a position bearing the closest resemblance to each of the partial images in the registered fingerprint image; an image combining means for combining the partial image arranged at the position bearing the closest resemblance with a partial composite image having been composed up to this point to produce an extended partial composite image; a fingerprint collating means for judging the similarity between a composite image composed of all the inputted partial images and the registered fingerprint image; a composite image optimum position calculating means for finding a position where the partial image fits with least discordance in the partial composite image composed of previous partial images; and a rough match determination means for accumulating the first penalty indices, and determining that the inputted fingerprint matches the registered one when the cumulative sum of the first penalty indices does not exceed a predetermined penalty threshold, and the area of the partial composite image combined by the image combining means becomes larger than a predetermined area threshold; wherein the image combining means combines the partial images according to the results derived by the registered image optimum position calculating means and the composite image optimum position calculating means.

BRIEF DESCRIPTION OF THE DRAWINGS

FIG. 1 is a block diagram showing a fingerprint identification device according to the first embodiment of the present invention;

FIG. 7 is a flowchart illustrating a fingerprint identification method according to the fourth embodiment;

FIG. 8 is a flowchart illustrating a conventional fingerprint identification method.

Figure 2:
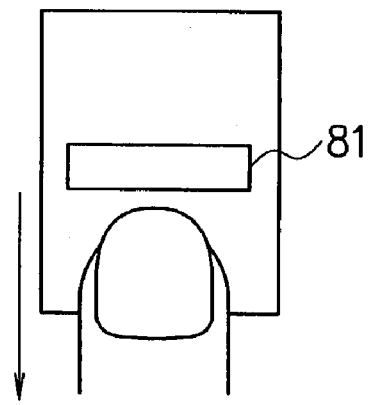
FIG. 2 is a group of diagrams illustrating the usage of sensors adopted in the fingerprint identification device according to the first embodiment.
Figure 2:
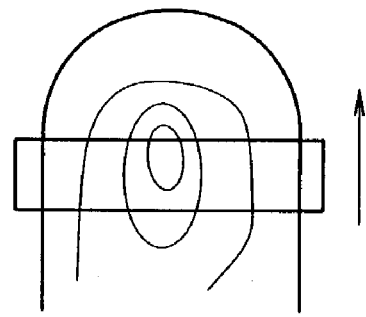
Figure 2:
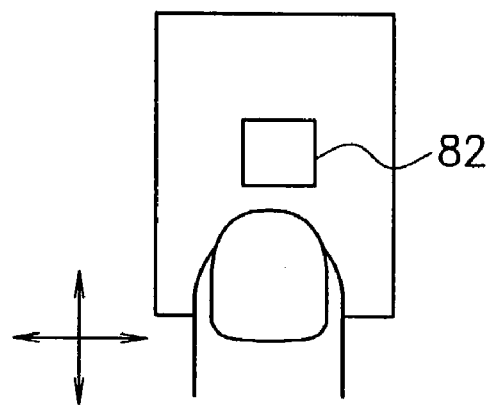
Figure 2:
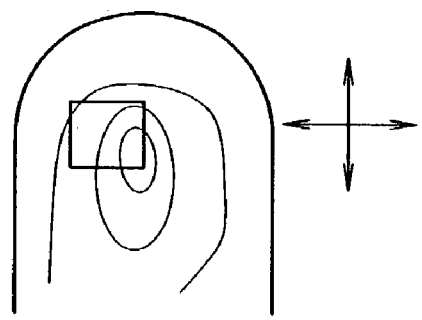
Figure 2:
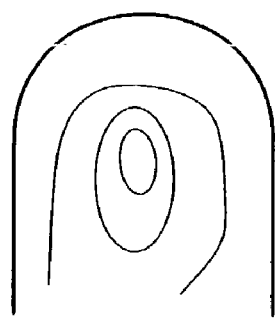
Figure 2:
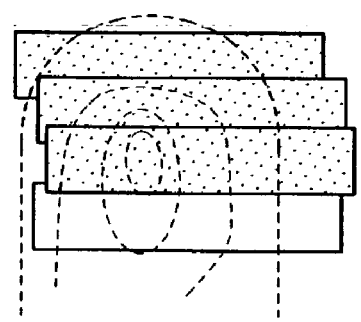

Incidentally, in FIGS. 1 to 8, each reference numeral denotes each component as follows:

50: Frame input section
51: Frame image storage section
52: Template image storage section

53: Partial composite image storage section
54: Template reference character storage section
55, 56: Optimal position calculator
57, 58: Frame positioning section
60: Image combining section
61: Composite image storage section
62: Reference character extracting section
63: Fingerprint character collator
64: Match determining section
65: Accurate match determining section
66: Rough match determining section
67: Position error penalty valuator
68: Rough mismatch determining section
69: Quality determining section
81, 82: Sensor

BEST MODE FOR CARRYING OUT THE INVENTION

[First Embodiment]

In the following, a method and device for fingerprint identification according to the first embodiment of the present invention will be described with reference to FIGS. 1 and 2. FIG. 1 is a block diagram showing a fingerprint identification device in the first embodiment, and FIG. 2 is a group of diagrams illustrating the usage of sensors applied to the fingerprint identification device of the embodiment. The fingerprint identification device is provided to an information appliance for personal use, such as an information terminal, a video game machine, and a cellular phone, for conducting user validation by using fingerprints to protect the information appliance from being used by someone other than its user(s), or to arrange individual settings for each user.

In FIG. 1, the numeral 50 represents a frame input section for inputting a fingerprint image for identification purposes. The frame input section 50 is a sensor having function as a camera or a scanner, etc. to sequentially take partial images of a moving object, and formed of a rectangular shape smaller than a fingerprint region, for example, like a sensor 81 in FIG. 2(a). A user moves his/her finger relative to the sensor 81 in the direction of the arrow (or in the opposite direction), and accordingly, plural partial images (frames) of a fingerprint are sequentially shot in accord with the movement. FIG. 2(b) shows a relation between a frame and a fingerprint. The rectangular part in FIG. 2(b) indicates one frame. The frame input section 50 picks up images in preset timing by converting the concavity and convexity corresponding to ridges of a fingerprint into the contrast of image. As for the method to implement the above operation, there are described techniques in Japanese Patent Application Laid-Open No. HEI10-91769, No. HEI10-240906, HEI09-116128, HEI10-22641, and HEI10-255050. In addition, a method using a prism, a method using electric capacitance and the like are in practical use.

While the rectangular sensor 81 is taken as an example in the above description, the sensor does not always have to be given a rectangular shape. A sensor having a shape, for example, like a sensor 82 in FIG. 2(c) picks up a partial image as shown in FIG. 2(d), and achieves a similar effect. In this case, it is unnecessary to make a sweep motion linearly in one direction as above. The sweep need only be conducted so that an aggregation of regions covered by frame images is enough wide in the last result, and thus allowing a freer sweep motion.

The numerals 51 and 52 denote a frame image storage section for storing inputted frame images and a template image storage section for previously storing a fingerprint(s) of a registered user(s) of an information appliance as a registered fingerprint(s) (template), respectively. On registration, it is possible to take a fingerprint image using, for example, a two-dimensional sensor (which is wide enough to cover the most part of a fingerprint region) attached to equipment other than the information appliance, and store the fingerprint image in the template image storage section 52 by transferring a file containing a shading image of the fingerprint image to the information appliance from the outside. FIG. 2(e) is a diagram showing an example of a fingerprint image (template image) T registered in the template image storage section 52. Besides, the numeral 53 represents a partial composite image storage section for storing a partial composite image that is composed of partial images inputted before. The numeral 54 represents a template reference character storage section for extracting reference characters from a fingerprint of a registered user of the information appliance and storing the characters.

In addition, an optimal position calculator 55 positions a frame image f(n) stored in the frame image storage section 51 with respect to the template image T registered in the template image storage section 52, and determines an optimal position of the frame image f(n). The above-mentioned SSDA is applicable to implement the positioning. Namely, the frame image f(i, j) (i and j denote x-coordinate and y-coordinate, respectively) is put to overlap the template image T(i, j) (i and j denote x-coordinate and y-coordinate, respectively) and moved in parallel all over the image T(i, j) little by little, and accordingly, the best-matching position is determined as the optimal position of the frame image f(i, j). In order to carry out the above operation, when the frame image f(i, j) is moved in parallel by (x, y) from the origin of the template image T(i, j), cumulative error in density levels of shading between two images, or penalty c(x, y) is calculated by the following expression to find (x, y) with the minimum penalty c(x, y).

$$c(x, y) = \sum_i \sum_j |T(i, j) - f(i - x, j - y)| \qquad (2)$$

Incidentally, two cumulative sums $\Sigma$ are found over i and j regarding a certain area in the overlapping regions of the template image T(i, j) and the frame image f(i-x, j-y).

In order to implement the positioning, other methods such as the cross-correlation method are also applicable as an alternative to the SSDA.

A frame positioning section 57 regards the frame as available for composition and determines the position at the translation distance (x, y) to be a determinate position when the minimum penalty c(x, y) found by the optimal position calculator 55 is not greater than a certain threshold, or to halt the process and proceed to take the next frame regarding the frame as unusable for composition when the minimum penalty c(x, y) exceeds the threshold.

An image combining section 60 combines the partial composite image, which is composed of a sequence of previous frame images and stored in the partial composite image storage section 53, with the frame image in process on the basis of position information outputted from the frame positioning section 57. FIG. 2(f) illustrates an aspect of the image composition when a frame image f(n) of the nth frame (n=4) is inputted. In FIG. 2(f), the upper gray part being an aggregation of three frame images is a partial composite image S(n−1) composed of a sequence of frame images f(1) to f(n−1) stored in the partial composite image storage section 53, and the lower rectangular part is the frame image f(n). In an example of composition method, it is possible to add a new region of the frame image f(n), which does not overlap the partial composite image S(n−1), to the image S(n−1). The composition result is written in the partial composite image storage section 53 as a new and wider partial composite image S(n).

A composite image storage section 61 stores a composite image being the final resultant image after all available frames have been read and combined. When the composite image has the area wider than a predetermined threshold, the composite image can be regard as a two-dimensional image covering enough area for collation. When the area of the composite image is smaller than the threshold, it is decided that user's sweep motion was inadequate, and thus the user is prompted to conduct a re-sweep.

A reference character extracting section 62 extracts reference characters from the two-dimensional composite image stored in the composite image storage section 61. Besides, a fingerprint character collator 63 collates fingerprint characters of a user who is inputting the fingerprint, which are figured out by the reference character extracting section 62, with fingerprint characters of a valid user stored in the template reference character storage section 54, and outputs the similarity of them. As examples for implementing a fingerprint collator including the reference character extracting section 62 and the fingerprint character collator 63, there are described fingerprint collators in Japanese Patent Application Laid-Open No. SHO56-24675 and No. HEI4-33065. These techniques enable the stable and highly accurate verification by searching, in addition to a position and direction of each characteristic point that gives a fingerprint a distinction, the number of ridges, or relations, between an origin characteristic point and the characteristic points closest to the origin in respective sectors of a local coordinate system uniquely determined by the characteristic points.

A match determining section 64 performs prescribed operations such as permitting the user to use the information appliance on the assumption that the fingerprints match each other when the collation result at the fingerprint character collator 63 shows a high similarity, and not permitting the use by regarding the fingerprints as mismatched when the verification result shows a low similarity.

Figure 3:
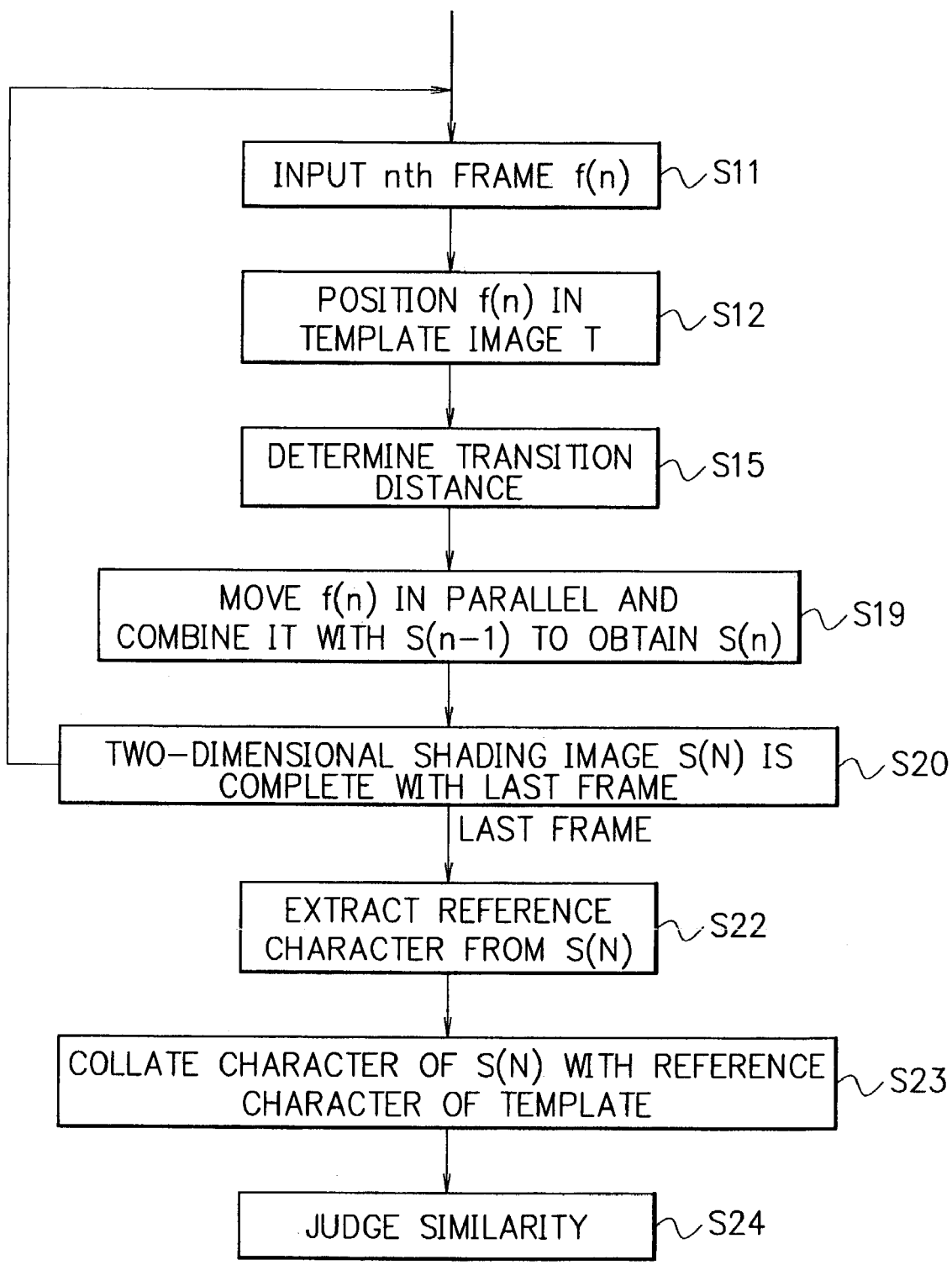
FIG. 3 is a flowchart illustrating a fingerprint identification method according to the first embodiment.

In the following, the operation of fingerprint identification according to the first embodiment of the present invention will be explained with reference to FIG. 3. FIG. 3 is a flowchart showing a fingerprint identification method of the embodiment. In this description, the information appliance to which the embodiment is applied is, for example, a cellular phone, and the registered user is its owner alone. An owner A previously enrolls his/her fingerprint data in the fingerprint identification device on such occasions as to start using the information appliance. In the enrollment, for example, two-dimensional image data including the enough area of fingerprint region are taken by an external fingerprint input scanner, and the image data are stored in the template image storage section 52 of FIG. 1 as a template image. Besides, the template image T is also inputted to the reference character extracting section 62, or an external device having the same function as the section 62 to figure out characters of the fingerprint, and the fingerprint characters of the template image T used for verification are stored in the template reference character storage section 54.

When a user X tries to use a function of the information appliance that requires user authentication, the user X sweeps his/her fingerprint on a sensor. Accordingly, frames, which are partial images of the fingerprint in a form corresponding to the shape of the sensor, are inputted. f(1)–f(n)–f(N) represent a sequence of the partial images. When the first frame f(1) is inputted (step S11), positioning is performed to search for a part similar to the frame image f(1) in the template image T (step S12). If the inputted image f(1) is a part of the fingerprint identical with the template image T, a position bearing a strong resemblance can be found. Thus an optimal position with the highest similarity is determined in the positioning (step S12). Subsequently, f(1) becomes a partial composite image S(1), and the optimal position becomes a basing point that is stored as an optimal position of the partial composite image S(1) (step S15, S19).

After that, when the nth frame f(n) (n: an integer 2 or more) is inputted (step S11), the positioning of the frame f(n) with respect to the template image T is executed, and an optimal position with the highest similarity, namely, with the least penalty is determined (step S12). The optimal position is compared to the basing point position of S(n−1), which bas been decided before, for positioning the frame image f(n) with respect to the partial composite image S(n−1) (step S12), and accordingly, the frame image f(n) is moved and combined with the partial composite image S(n−1) to form a partial composite image S(n) larger than S(n−1) (step S15, S19).

Incidentally, in the above positioning, it is possible to dismiss the frame image f(n) rating it as insufficient in quality for composition when the similarity between the frame image f(n) and the template image T is lower than a predetermined threshold, or the dissimilarity between them is higher than a threshold.

Such frame inputting and combining operations are repeated until all frames are processed, and a two-dimensional shading composite image S(N) is obtained in the last result (step S20). When having an area wider than a predetermined threshold, the composite image S(N) is regarded as a sufficient size of two-dimensional fingerprint image of user X, and fingerprint reference characters are extracted from S(N) (step S22). The fingerprint characters of the user X obtained as above are collated with the registered fingerprint characters of the owner A (step S23). When both the fingerprint characters match each other, the user X is recognized as the owner A, and permitted to use the information appliance (step S24).

[Second Embodiment]

Figure 4:
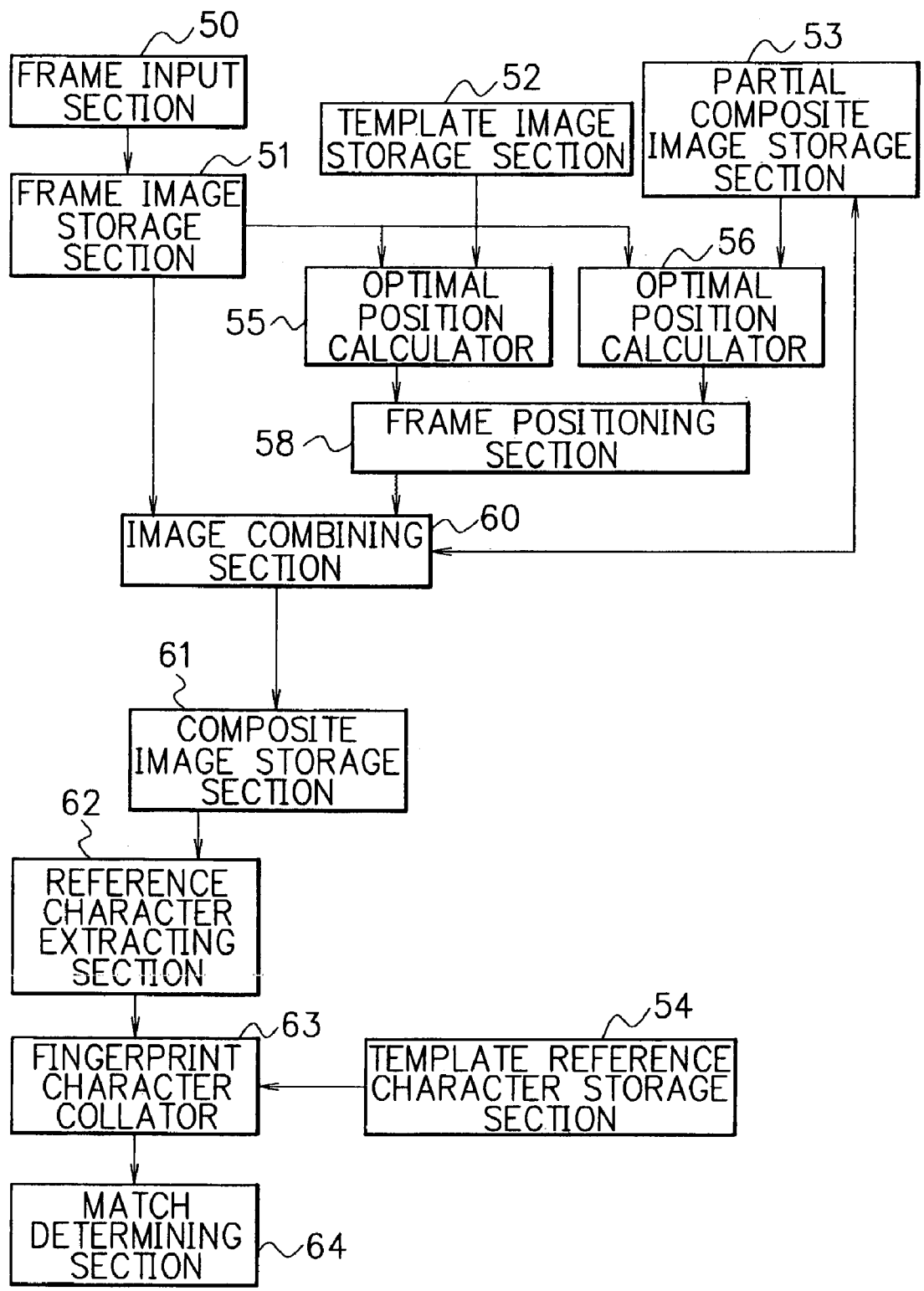
FIG. 4 is a block diagram showing a fingerprint identification device according to the second or third embodiment of the present invention.

In the following, the second embodiment of the present invention will be explained with reference to FIG. 4. FIG. 4 is a block diagram showing a fingerprint identification device according to the second embodiment of the present invention. In FIG. 4, the same parts are designated by the same numerals as in FIG. 1, and explanations thereof will be omitted. The major difference between FIGS. 1 and 4 is that in FIG. 4, an optimal position calculator 56 is provided in addition to the optimal position calculator 55. The optimal position calculator 55 of FIG. 4 conducts the positioning of the frame image f(n) stored in the frame image storage section 51 with respect to the template image T registered in the template image storage section 52, and figures out a position p1 having a minimum penalty c1. On the other hand, the optimal position calculator 56 conducts the positioning of the frame f(n) stored in the section 51 with respect to the partial composite image S(n−1) stored in the partial composite image storage section 53, and figures out a position p2 having a minimum penalty c2. The SSDA method is applicable to implement the positioning.

A frame positioning section 58 determines a position p3, which is figured out based on the positions p1 and p2, to be a determinate position by regarding the frame f(n) as appropriate for composition when the minimum penalties c1 and c2 are not greater than a certain threshold, or to halt the process and proceed to take the next frame by regarding the frame f(n) as inappropriate when the penalty c1 and/or c2 exceed(s) the threshold. Additionally, when both the minimum penalties c1 and c2 are not greater than the threshold, the position p3 is found by a weighted average of reciprocals of the minimum penalties c1 and c2 (which are in inverse proportion to the similarity) of the respective direction vectors p1 and p2, as shown by the following expression:

$$p3=(c2/(c1+c2))p1+(c1/(c1+c2))p2 \quad (3).$$

Incidentally, all p1, p2 and p3 are two-dimensional direction vectors.

Figure 5:
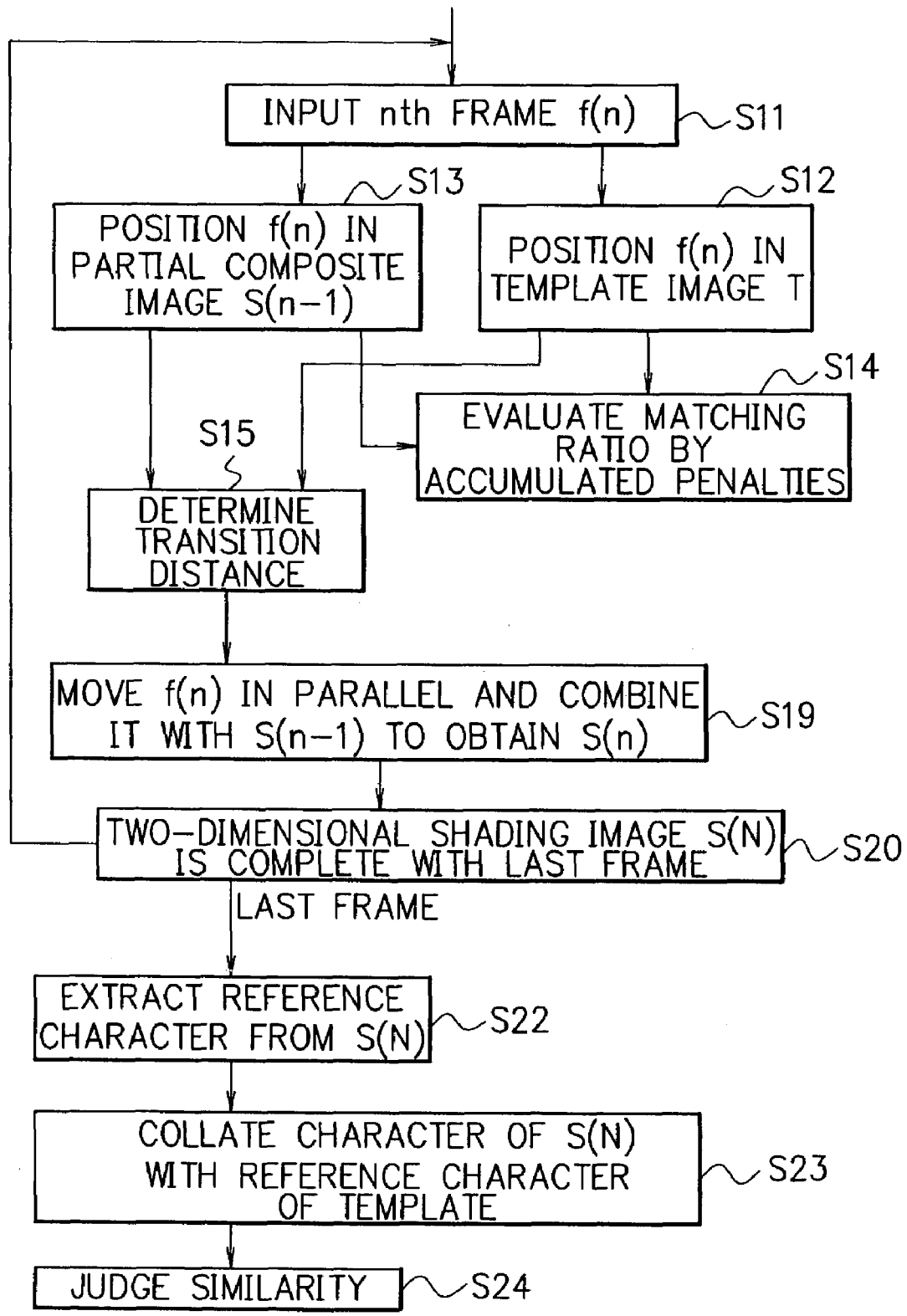
FIG. 5 is a flowchart illustrating a fingerprint identification method according to the second or third embodiment.

Next, the operation according to the second embodiment of the preset invention will be explained with reference to FIG. 5. In FIG. 5, the same parts are designated by the same numerals as in FIG. 3, and explanations thereof will be omitted. The major difference between FIGS. 3 and 5 is that in FIG. 5, steps S13 and S14 are added to the operation. In short, the frame image f(n) is positioned with respect to the template image T, and an optimal position p1 having a minimum penalty c1 in the positioning with respect to the template image T is figures out (step S12). At the same time, the frame image f(n) is positioned with respect to the partial composite image S(n−1), and an optimal position p2 having a minimum penalty c2 in the positioning with respect to the partial composite image S(n−1) is figured out (step S13).

Subsequently, an optimal translation distance p3 for the frame f(n) to be combined with the partial composite image S(n−1) is calculated by using the above expression (3) based on the information including the optimal positions p1 and p2 (and the minimum penalties c1 and c2), and the result is compared to the basing point of the partial composite image S(n−1) to position the frame f(n) with respect to the partial composite image S(n−1) (step S15). The operations at the other steps in FIG. 5 are the same as those in FIG. 3.

[Third Embodiment]

In the following, the third embodiment of the present invention will be explained with reference to FIG. 4. This embodiment differs from the second embodiment in a manner of determining the position p3 at the frame positioning section 58. That is, in the second embodiment, the optimal position p1 obtained at the optimal position calculator 55 as a result of the positioning with respect to the template image T and the optimal position p2 obtained at the optimal position calculator 56 as a result of the positioning with respect to the partial composite image S(n−1) are weighted inversely to the minimum penalties c1 and c2, and averaged as shown by expression (3). Thus the position p3 is determined at the frame positioning section 58.

On the other hand, the third embodiment adopts another calculating method, which takes advantage of the assumption that the wider the partial composite image S(n−1) becomes as more frames are combined therewith, the more reliable the image S(n−1) is. Namely, at the frame positioning section 58, the position p3 is determined by the following expressions when both the minimum penalties c1 and c2 are not greater than a threshold.

$$q1=(\exp(-Ca))c1/(c1+c2) \quad (4)$$

$$q2=(1-\exp(-Ca))c2/(c1+c2) \quad (5)$$

$$p3=q1\,p1+q2\,p2 \quad (6)$$

Incidentally, all p1, p2 and p3 are two-dimensional direction vectors. a denotes a parameter indicating the area of the partial composite image S(n−1), and C denotes a positive constant.

As shown by expressions (4) and (5), q1 and q2 indicate the weights of respective vectors, which are calculated from the position error penalties in light of the area a of the partial composite image S(n−1). According to the expressions, when the first frame f(1) is inputted, q2 is zero since the area a is zero, and as the number of frames used for composition increases (n becomes larger), the contribution of q2 becomes more significant along with the expansion of the partial composite image S(n−1) (an increase in the area a).

Next, the operation of the third embodiment according to the preset invention will be explained with reference to FIG. 5. This embodiment differs from the second embodiment in the operation at step S15. That is, in the second embodiment, the position p3 is determined by the expression (3) at step S15, while in the third embodiment, the position p3 is determined by expressions (4), (5) and (6). The operations at the other steps in FIG. 5 are the same as with the second embodiment.

[Fourth Embodiment]

Figure 6:
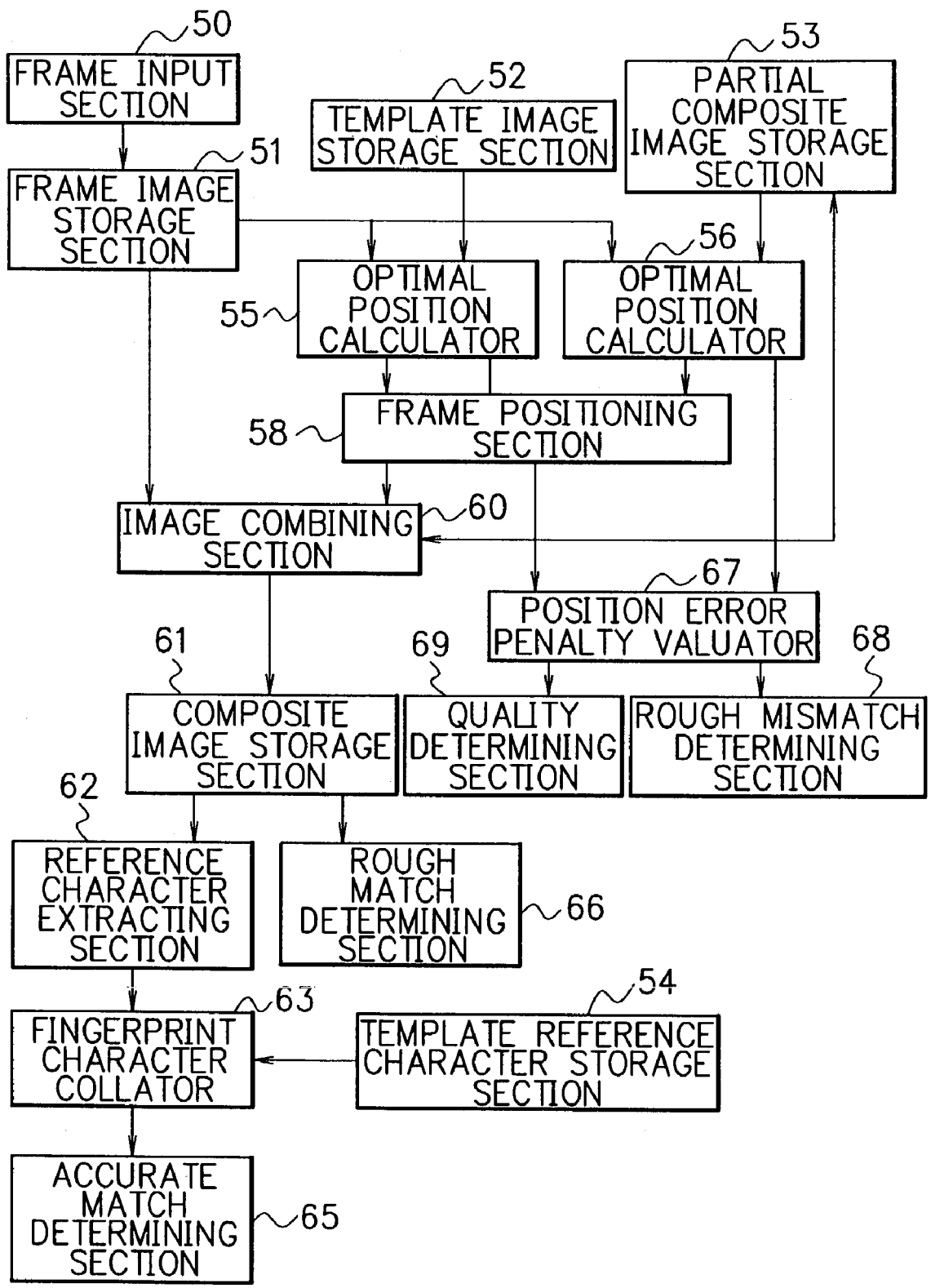
FIG. 6 is a block diagram showing a fingerprint identification device according to the fourth embodiment of the present invention.

In the following, the fourth embodiment of the present invention will be explained with reference to FIG. 6. FIG. 6 is a block diagram showing a fingerprint identification device according to the fourth embodiment of the present invention. The objects of this embodiment include implementation of the user authentication with fewer calculations as well as improvement in the accuracy of composition. In FIG. 6, the same parts are designated by the same numerals as in FIG. 4, and explanations thereof will be omitted. The major difference between FIGS. 4 and 6 is that in FIG. 6, there are provided an accurate match determining section 65, a rough match determining section 66, a position error penalty valuator 67, a rough mismatch determining section 68, and a quality determining section 69.

The accurate match determining section 65 executes prescribed operations such as permitting a user to use the information appliance on the assumption that fingerprints match each other when the result of collation at the fingerprint character collator 63 indicates a high similarity, or not permitting the use, even if the rough mismatch determining section 68 has not judged fingerprints mismatch, by regarding fingerprints as mismatching in the strict sense when the collation result indicates a low similarity.

The rough match determining section 66 outputs a rough determination result that the inputted fingerprint matches with the template, in other words, the user X is identical to the registered user A, when many frames are combined without an excess of the accumulated minimum penalties c1 over the threshold and the resultant image measures over the certain size. This method is efficient to identify a user at high speed in applications that do not require highly accurate verification.

The position error penalty valuator 67 receives the minimum penalty c1 in the positioning with respect to the template image T from the optimal position calculator 55 and the minimum penalty c2 in the positioning with respect to the partial composite image S(n−1) from the optimal position calculator 56, and makes decisions concerned with the position error by accumulating the minimum penalties c1 and c2 as n increases and comparing the accumulated penalties respectively to a prescribed threshold. That is, the first function of the position error penalty valuator 67 is to calculate the accumulated value of the minimum penalties c2 in the positioning of the frame image f(n) with respect to the partial composite image S(n−1) in order to evaluate the inter-frame consistency in the image composition up to this point. Besides, the position error penalty valuator 67 calculates the accumulated value of the minimum penalties c1 in the positioning of the frame image f(n) with respect to the template image T in order to evaluate the similarity between the registered fingerprint of the template image T and the inputted fingerprint.

The rough mismatch determining section 68 determines that the fingerprint of the user X who is inputting the fingerprint differs from the fingerprint of the registered user A enrolled as the template image T when the accumulated value of the minimum penalties c1 of respective frames calculated at the position error penalty valuator 67 exceeds a threshold, and apprises the user X of the rejection of the use of the information appliance. Generally, highly accurate result cannot be expected in the fingerprint identification based on the difference in density levels of shading in images at the rough mismatch determining section 68, and therefore the verification using specific features of fingerprints is also conducted at the above-mentioned accurate match determining section 65 when accuracy is required.

The quality determining section 69 determines that the composite image is low in quality for such reasons as that the sweep (movement) rate of a finger against the sensor is too fast, or distortion of the fingerprint image is large due to the elastic deformation of fingerprint region in a sweep motion when the accumulated value of the minimum penalties c2 of respective frames calculated at the position error penalty valuator 67 exceeds a threshold, and prompts the user X to re-input (re-sweep) his/her fingerprint.

In the following, the operation of fingerprint identification according to the fourth embodiment of the present invention will be explained with reference to FIG. 7. FIG. 7 is a flowchart illustrating a fingerprint identification method of the embodiment. FIG. 7 differs from FIG. 5 mainly in the operations of steps S16, S17, S21 and S25. That is, the accumulated value of the minimum penalties c1 in the positioning of the frame image f(n) with respect to the template image T is calculated, and when the accumulated value of the penalties c1 exceeds a threshold, the user X is apprised of the rejection of the use of the information appliance (step S16).

In addition, the accumulated value of the minimum penalties c2 in the positioning of the frame image f(n) with respect to the partial composite image S(n−1) is calculated, and when the accumulated value of the penalties c2 exceeds the threshold, the user X is prompted to re-input (re-sweep) his/her fingerprint (step S17).

On the other hand, if the accumulated value of the penalties c1 does not exceed the threshold when numbers of frames have been combined and the resultant image reaches a certain size, it is determined that the inputted fingerprint matches the template image T, namely, the user X is identical with the registered user A. Thus, the result of rough determination is outputted (step S21).

In the fingerprint identification, such judgment based on the difference in density levels of shading in images is just simplified one, and highly accurate result cannot be expected. Therefore, when accuracy is required, fingerprint reference characters are extracted from S(N) (step S22), and the extracted characters are collated with the registered fingerprint characters of the owner A (step S23). Thus accurate judgment for the fingerprint identification is made (step S25). The operations at the other steps in FIG. 7 are the same as in FIG. 5.

Incidentally, in the above description of the embodiments, one user is registered in the fingerprint identification device and only one template fingerprint is enrolled therein. However, there may be plural numbers of templates enrolled in the fingerprint identification device. In this case, the above processes are executed for each template. After that, a template having the minimum penalty is selected and the succeeding processes are carried out using the template. Consequently, it is possible that a small number of users share an information appliance, or a user enrolls plural fingerprints to make differences in operation according to fingers.

INDUSTRIAL APPLICABILITY

As set forth hereinabove, in a method and device for fingerprint identification in accordance with the present invention, fingerprint information of registered users (template) is used to reassemble partial images (frames) inputted from a sensor into a complete image by taking advantage of characteristics of information appliances for individuals that there are only one or a few registered user(s). Thus, it is possible to position the partial images precisely and improve the accuracy of image composition.

Accordingly, even in the case where the sweep rate of a finger against the sensor is high and the overlapping area between each frame is small, positioning can be performed more accurately compared with conventional techniques, by which it has been difficult to obtain the optimal distance of inter-frame in such the case. Thus, the accuracy of fingerprint verification can be improved. That is, the present invention provides greater flexibility in the sweep motion while ensuring stability in the collating operation, which enhances the convenience for users.

Moreover, it is also possible to reduce necessary calculations for executing effective positioning and thereby speeding up the process, or to reduce the price of a computing unit used for the process.

Furthermore, in the fingerprint identification device in accordance with the present invention, it is possible to perform fingerprint verification with accuracy equal to, or higher than that of conventional verification by using a sensor smaller than a conventional two-dimensional sensor. Thereby, the cost of the device can be reduced along with the reduction in the cost of the sensor that increases in proportion to the size. In addition, the device can be miniaturized by using the smaller sensor and made more mountable, which contributes to the expansion of the field of application of the device.

Furthermore, when highly accurate verification is not required, a moderately accurate verification result can be obtained at a higher speed, or with less computation by evaluating the similarity between an inputted fingerprint and a template image based on the accumulated value of positioning penalties without using fingerprint reference characters.

The invention claimed is:

1. A fingerprint identification method, in which a plurality of partial images of a fingerprint is inputted and the similarity between the plurality of partial images and a registered fingerprint image is judged, comprising:

determining an optimal position for each of the partial images within the registered fingerprint image in which a first penalty index which represents a difference between one of the plurality of partial images and the registered fingerprint image is minimized for each partial image;

arranging and combining the partial images based the optimal position for each partial image to form a composite image having an area;

accumulating the first penalty index for each partial image to determine a total first penalty value; and determining that the plurality of partial images differs from the registered fingerprint image when the total first penalty value exceeds a predetermined penalty threshold, when the area of the composite image exceeds a predetermined threshold.

2. A fingerprint identification method, in which a plurality of partial images of a fingerprint is inputted and the similarity between the plurality of partial images and a previously registered fingerprint image is judged, comprising:

determining an optimal position for each of the partial images within the registered fingerprint image in which a first penalty index which represents a difference between one of the plurality of partial images and the registered fingerprint image is minimized for each partial image;

arranging and combining the partial images based on the optimal position for each partial image to form a composite image;

collating the composite image with the registered fingerprint image to determine an amount of similarity between the composite image and the registered fingerprint image;

and determining that the plurality of fingerprint images input differs from the registered fingerprint image when the amount of similarity falls below a predetermined penalty threshold.

3. A fingerprint identification method, in which a plurality of partial images of a fingerprint are inputted and the similarity between the plurality of partial images and a registered fingerprint image is judged, comprising:

determining an optimal position for each of the partial images within the registered fingerprint image in which a first penalty index which represents a difference between one of the plurality of partial images and the registered fingerprint image is minimized for each partial image;

accumulating the first penalty index for each partial image to determine a total first penalty value;

arranging and combining the partial images based on the optimal position for each partial image to form a composite image having an area; and determining that the plurality of partial images resembles the registered fingerprint image when the total first penalty value does not exceed a predetermined penalty threshold, and the area of the composite image becomes larger than a predetermined area threshold.

4. A fingerprint identification method, in which a plurality of partial images of a fingerprint are inputted and the similarity between the plurality of partial images and a registered fingerprint image is judged, comprising:

determining an optimal position for each of the partial images within of the registered fingerprint image in which a first penalty index which represents a difference between one of the plurality of partial images and the registered finger print image is minimized for each partial image;

arranging and combining the partial images based on the optimal position for each partial image to form a composite image having an area;

collating the composite image with the registered fingerprint image to determine an amount of similarity between the composite image and the registered fingerprint image;

and determining that the plurality of fingerprint images resembles the registered fingerprint image when the amount of similarity does not exceed a predetermined similarity threshold, and the area of the composite image becomes larger than a predetermined area threshold.

5. A fingerprint identification method, in which a plurality of partial images of a fingerprint is inputted and the similarity between the plurality of partial images and a registered fingerprint image is judged, comprising:

determining an optimal position for each of the partial images within the registered fingerprint image in which a first penalty index which represents a difference between one of the plurality of partial images and the registered fingerprint image is minimized for each partial image;

arranging and combining the partial images based on the optimal position for each partial image to form a composite image having an area;

collating the composite image with the registered fingerprint image to determine an amount of similarity between the composite image and the registered fingerprint image;

finding a composite position where one of the plurality of partial image fits with least discordance in the composite image; and arranging and combining the partial images based on the composite position.

6. The fingerprint identification method claimed in claim 5, further comprising:

calculating a second penalty index of each partial image such that the second penalty index which represents a difference between each one of the partial images and the partial composite image is a minimize; and wherein the optimal position is determined based on the first penalty index and second penalty index.

7. The fingerprint identification method claimed in claim 6, wherein the optimal position is determined based on the first penalty index and second penalty index in which effect of the second penalty index in determining the optimal position is increased as each partial images is arranged and combined into the partial composite image.

8. A fingerprint identification device for judging the similarity between fingerprint and a previously registered fingerprint image using a plurality of partial images of the fingerprint, comprising:

a frame image input unit which inputs the partial images of the fingerprint;

a registered image optimum position calculating unit which calculates a first penalty index which represents a difference between one of the partial images and the registered fingerprint image when the one of the partial images is at comparison positions;

an image combining unit which combines and arranges the partial images at a position bearing the closest correlation with a partial composite image composed of previously combined and arranged partial images;

a fingerprint collating unit which judges the similarity between a composite image composed of the partial images and the registered fingerprint image; and a composite image optimum position calculating unit which determines an optimal position where the partial image fits with least discordance in the partial composite image composed of previously combined and arranged partial images; wherein the image combining unit combines and arranges the partial images according to the first penalty index and the optimal position.

9. A fingerprint identification device for judging the similarity between fingerprint and a previously registered fingerprint image using a plurality of partial images of the fingerprint, comprising:
- a frame image input unit which input the partial images of the fingerprint;
- a registered image optimum position calculating unit which calculates first a penalty index which represents a difference between one of the partial images and the registered fingerprint image;
- an image combining unit which combines and arranges the partial images at a position bearing the closest correlation with a partial composite image composed of previously combined and arranged partial images;
- a fingerprint collating unit which judges the similarity between a composite image composed of the partial images and the registered fingerprint image; and
- a mismatch determination unit which accumulates the first penalty index for each of the inputted partial images and determines that the fingerprint differs from the registered fingerprint image when the accumulated first penalty indices exceeds a predetermined penalty threshold.

10. A fingerprint identification device for judging the similarity between a fingerprint and a previously registered fingerprint image using a plurality of partial images of the fingerprint, comprising:
- a frame image input unit which inputs the partial images of the fingerprint;
- a registered image optimum position calculating unit which calculates a first penalty index which represents a difference between one of the partial images and the registered fingerprint image when the one of the partial images at a comparision position;
- an image combining unit which combines and arranges the partial images at a position bearing the closest correlation with a partial composite image composed of previously combined and arranged partial images;
- a fingerprint collating unit which judges the similarity between a composite image composed of the partial images and the registered fingerprint image;
- a composite image optimum position calculating unit which determines an optimal position where the partial image fits with least discordance in the partial composite image composed of previous combined and arranged partial images; and
- a mismatch determination unit which accumulates the first penalty index for each of the partial images and determines that the fingerprint differs from the registered fingerprint image when a value of the accumulated first penalty indices exceeds a predetermined penalty threshold.

11. A fingerprint identification device for judging the similarity between fingerprint and a previously registered fingerprint image using a plurality of partial images of the fingerprint, comprising:
- a frame image input unit which inputs the partial images of the fingerprint; a registered image optimum position calculating unit which calculates a first penalty index which represents a difference between one of the partial images and the registered fingerprint image;
- an image combining unit which combines and arranges the partial images at a position bearing the closest correlation with a previous partial composite image to create a partial composite image;
- a fingerprint collating unit which judges the similarity between a composite image composed of the partial images and the registered fingerprint image; and
- a rough match determination unit which accumulates each first penalty index, and determines that the fingerprint matches the registered fingerprint image when an accumulated value of first penalty indices does not exceed a predetermined penalty threshold, and the area of the partial composite image combined by the image combining unit exceeds a predetermined area threshold.

12. A fingerprint identification device for judging the similarity between a fingerprint and a previously registered fingerprint image using a plurality of partial images of the fingerprint, comprising:
- a frame image input unit which inputs the partial images of the fingerprint;
- a registered image optimum position calculating unit which calculates a first penalty index which represents a difference between one of the partial images and the registered fingerprint image;
- an image combining unit which combines and arranges the partial image at a position bearing the closest correlation with a previous partial composite image composed of previously combined and arranged partial images to form a partial composite image having an area;
- a fingerprint collating unit which judges the similarity between a composite image composed of the partial images and the registered fingerprint image;
- a composite image optimum position calculating unit which finds an optimal position where the partial image fits with least discordance in the partial composite image composed of previous combined and arranged partial images; and
- a rough match determination unit which accumulates each first penalty index for each partial image, and determines that the fingerprint matches the registered fingerprint image when a value of the accumulated first penalty indices does not exceed a predetermined penalty threshold, and the area of the partial composite image combined by the image combining unit becomes larger than a predetermined area threshold; wherein
- the image combining unit combines and arranges the partial images according to the first penalty index and the optimal position.

* * * * *

UNITED STATES PATENT AND TRADEMARK OFFICE
CERTIFICATE OF CORRECTION

| | | |
|---|---|---|
| PATENT NO. | : 7,194,115 B2 | Page 1 of 1 |
| APPLICATION NO. | : 10/333755 | |
| DATED | : March 20, 2007 | |
| INVENTOR(S) | : Kaoru Uchida | |

It is certified that error appears in the above-identified patent and that said Letters Patent is hereby corrected as shown below:

Title page, item (30) should read -- FOREIGN APPLICATION PRIORITY DATA

Jul. 28, 2000         (JP) ...........................................2000-230042

Signed and Sealed this

Twelfth Day of June, 2007

JON W. DUDAS
*Director of the United States Patent and Trademark Office*